United States Patent [19]

Schmidt et al.

[11] 4,374,696

[45] Feb. 22, 1983

[54] METHOD OF HEAT-SEALING SUBSTRATES

[75] Inventors: Helmut Schmidt, Höchberg; Gerhard Tünker; Horst Scholze, both of Würzburg, all of Fed. Rep. of Germany

[73] Assignee: Fraunhofer-Gesellschaft, Munich, Fed. Rep. of Germany

[21] Appl. No.: 246,111

[22] Filed: Mar. 20, 1981

[30] Foreign Application Priority Data

Mar. 26, 1980 [DE] Fed. Rep. of Germany ....... 3011761

[51] Int. Cl.$^3$ .......................... C09J 3/00; B32B 9/00; B32B 17/06
[52] U.S. Cl. .......................... 156/329; 156/DIG. 64; 428/429; 428/447; 427/387; 53/287
[58] Field of Search ........... 156/329, 307.3, DIG. 64, 156/306.9, 99, 106, 307.7; 428/447, 450, 429; 260/29.1 SB; 427/387, 376.2, 344, 234; 53/287

[56] References Cited

U.S. PATENT DOCUMENTS 4,188,451 2/1980 Humphrey, Jr. .................... 428/447

FOREIGN PATENT DOCUMENTS 2833334 6/1979 Fed. Rep. of Germany .
1454569 11/1976 United Kingdom .
2051842 1/1981 United Kingdom .

Primary Examiner—Edward C. Kimlin
Assistant Examiner—Louis Falasco
Attorney, Agent, or Firm—Birch, Stewart, Kolasch & Birch

[57] ABSTRACT

A method of heat-sealing substrates, particularly glass to glass or glass to other materials, which comprises using as a heat-sealing medium a silicic acid heteropolycondensate prepared by hydrolysis and polycondensation of at least one organosilane and at least one component selected from the group consisting of silicon-functional silanes, substantially involatile oxides soluble in the reaction medium, or compounds convertible thereto, and organofunctional silanes.

The heat-sealing bonds obtained are strong, durable and moisture resistant, the excellent moisture resistance being of special benefit in the heat-sealing of glass substrates.

39 Claims, No Drawings

METHOD OF HEAT-SEALING SUBSTRATES

BACKGROUND OF THE INVENTION

Heat-sealing is a method of joining two materials under the action of pressure and heat wherein at least one of the substrates is provided with a thermoplastic coating (sealing medium) which undergoes plastic deformation at the sealing temperature and is firmly pressed to the other substrate under the sealing pressure applied. On cooling, the thermoplastic sealing medium solidifies, thus forming a strong adhesive bond between the two substrates.

Heat-sealing methods are largely employed for the packaging of goods, especially of foodstuffs. Illustrative of articles prepared in this manner are flat aluminum bags for dehydrated soups as well as yogurt, cups made of polystyrene and having covers of aluminum foil coated with a sealing varnish. Useful as sealing media are various thermoplastic resins (thermoplastic adhesives), e.g. copolymers of vinyl chloride, vinylidene chloride and vinyl acetate, polyacrylates as well as polymethacrylates such as polymethylmethacrylate, polyurethanes, thermoplastic polyesters, ethylene/vinyl acetate copolymers, aliphatic and aromatic polyamides, polyethylene, and ionomeric ethylene copolymers.

Heat-sealing of glass containers has been of little practical importance up to now. This may be attributed partly to the fact that the proper balance between temperature, time and pressure of the sealing operation is difficult to achieve, and partly to the formulation of the sealing medium itself. In addition, there are two specific problems which arise when glass is selected as one of the substrates to be heat-sealed.

On the one hand, glass does not undergo plastic deformation at the sealing temperatures employed so that the sealing medium is not pressed evenly onto the glass surface, especially since glass normally has surface irregularities (tolerances). Uniform sealing pressure is, however, indispensable for achieving a tight, impervious bond when the heat-sealing operation involves e.g. glass containers.

On the other hand, the glass surface is normally hydrated, i.e. covered with a thin water film that cannot be completely removed even by high-vacuum heating to a temperature of 200° C. for a period of several hours. For the heat-sealing of glass, this means bonding the sealing medium to a surface covered with water molecules. Thus, all heat-sealing bonds obtainable with conventional sealing media on untreated glass containers substantially lose their strength within several hours or a few days. This is especially true when the heat-sealed substrates are exposed to moisture, as in the case of containers which are either filled with goods containing water, or are stored in water. It is assumed that in these instances, water molecules migrate under the sealing medium, aided by the above described water film.

German Auslegeschrift No. 28 33 334 discloses a method of improving the moisture resistance of adhesive bonds between glass and metal foils by first coating the rim of a glass container with an adhesion promoter having high affinity for glass as well as available reactive sites for crosslinking with the adhesive layer. As suitable adhesion promoters, there are mentioned silanes and organosilicon compounds, the latter not being specified in detail.

The use of such adhesion promoters for the heat-sealing of glass containers has the disadvantage that additional process steps and equipment are required for applying the adhesion promoters. This operation is less economical as investments will be considerably higher while the rates of series production are slowed down. Moreover, when proceeding in accordance with the prior art method of heat-sealing glass containers, there will always be the risk of food packed in these containers becoming contaminated by the adhesion promoter.

Thus, it is an object of the present invention to provide a method of heat-sealing substrates, particularly glass to glass or to other materials, which results in heat-sealing bonds of high moisture resistance without the use of an adhesion promoter for glass.

It has now been found that strong, durable heat-sealing bonds may be obtained by employing heat-sealing adhesives on the basis of thermoplastic, organomodified silicate materials (silicic acid heteropolycondensates) instead of conventional thermoplastic adhesives. When one of the substrates to be heat-sealed is glass, the sealing bond shows excellent moisture resistance even if the glass surface has not been previously coated with an adhesion promotor.

SUMMARY OF THE INVENTION

The invention relates to a method of heat-sealing substrates, particularly glass to glass or to other materials, using a thermoplastic material as sealing medium, wherein the preferred sealing media are silicic acid heteropolycondensates obtained by hydrolysis and polycondensation of:

(a) at least one organosilane of the general formula (I):

$$R_m SiX_{4-m} \qquad (I),$$

wherein R is alkyl, alkenyl, aryl, alkylaryl, or arylalkyl; X is hydrogen, halogen, hydroxyl, alkoxy, acyloxy, or a group —NR'$_2$ wherein R' is hydrogen and/or alkyl; and m is an integer of 1, 2, or 3; with at least one of the following components (b), (c) and (d):

(b) one or more silicon-functional silanes of the general formula (II):

$$SiX_4 \qquad (II),$$

wherein X is as defined above, with the proviso that not all of X are hydrogen;

(c) one or more substantially involatile oxides soluble in the reaction medium, or one or more compounds capable of forming such a substantially involatile oxide, of an element selected from Groups Ia to Va or IVb and Vb of the Periodic Table;

(d) one or more organofunctional silanes of the general formula (III):

$$R_n(R''Y)_p SiX_{(4-n-p)} \qquad (III),$$

wherein R and X are as defined above; R'' is straight-chain or branched alkylene, optionally interrupted by oxygen or sulfur atoms or —NH— groups, phenylene, alkylphenylene, or alkylenephenylene; Y is halogen, unsubstituted or substituted amino, unsubstituted or substituted anilino, aldehyde, keto, carboxyl, hydroxyl, mercapto, cyano, hydroxyphenyl, carboxylic acid alkyl ester, sulfonic acid, phosphoric acid, acryloxy, methacryloxy, glycidyloxy, epoxy, or vinyl; n is an integer of 0, 1, or 2; and p is an integer of 1, 2, or 3, the sum of n+p being an integer of 1, 2, or 3;

in the presence of at least the amount of water stoichiometrically required for hydrolysis, and optionally in the presence of a condensation catalyst and/or solvent, whereby oligomers of starting components (a) and (d) which are soluble in the reaction medium may be used instead of the monomeric silanes (a) and (d).

The above thermoplastic silicic acid heteropolycondensates generally comprise from 20 to 95% by weight of component (a), from 0 to 60% by weight of component (b), from 0 to 40% by weight of component (c), and from 0 to 20% by weight of component (d). Preferred is a minimum content of component (a) of 30% by weight, the upper limit being 90% by weight. The total content of components (b), (c) and/or (d) is at least 5% by weight, preferably at least 10% by weight, and not more than 80% by weight, preferably not more than 70% by weight.

For components (b), (c) and (d), a maximum concentration of 40% by weight, 30% by weight, and 10% by weight, respectively, is preferred.

The values indicated above refer to the oxide units of which the silicic acid heteropolycondensates are composed, meaning that each of the components (a), (b), (c) and/or (d) is employed in an amount sufficient to make the respective oxide unit during hydrolysis and condensation reach the indicated proportion in weight (% by weight) in the final condensate. The required quantity of organosilanes (a) is calculated, for instance, on the basis of oxide units as represented by formula $R_mSiO_{(4-m)/2}$, the basis for other calculations being oxide unit $SiO_2$ for silicon-functional silanes (b), and oxide unit (metal)$_2$O for e.g. metal alcoholates (c) as represented by formula metal-OR.

Components (a) and (b) are interchangeable inasmuch as an equivalent amount of corresponding monoalkyl silane may be used instead of a mixture of dialkyl silane (a) and an ortho-silicic acid ester (b).

In formulae (I), (II) and (III), any of substituents R, R', R'', X and Y occurring repeatedly in one and the same compound may have the same or a different meaning.

The alkyl groups may be straight-chain, branched or cyclic radicals having 1 to 20 carbon atoms, preferably 1 to 10 carbon atoms; particularly preferred are lower alkyl groups having 1 to 6 or, even better, 1 to 4 carbon atoms. Specific examples are methyl, ethyl, n-propyl, isopropyl, n-butyl, sec.butyl, tert. butyl, pentyl, n-hexyl, and cyclohexyl. Aryl groups may have 6 to 25 carbon atoms, preferably 6 to 14 carbon atoms, and particularly 6 to 10 carbon atoms. Specific examples are phenyl and naphthyl, with phenyl being preferred.

The alkenyl radicals may be straight-chain, branched or cyclic radicals having 2 to 20 carbon atoms, preferably 2 to 10 carbon atoms; of particular interest are lower alkenyl radicals such as vinyl and allyl.

Alkoxy, acyloxy, alkylamino, arylalkyl, alkylaryl, alkylene, alkylphenylene, alkylenephenylene, keto, carboxylic acid alkyl ester, substituted amino, and substituted anilino radicals may be derived from the above mentioned alkyl and aryl groups. Specific examples are methoxy, ethoxy, n-propoxy and iso-propoxy, m-butoxy as well as sec. and tert. butoxy, acetyloxy, propionyloxy, monoethylamino, dimethylamino, diethylamino, monomethylanilino, benzyl, tolyl, methylene, ethylene, trimethylene, and toluylene.

Optionally, the above radicals may be substituted with e.g. halogen atoms, lower alkyl, hydroxyl, nitro, or amino groups.

Preferred halogens are fluorine, chlorine and bromine, particularly chlorine.

Preferably, m is 2, n is zero, and p is 1.

Illustrative of suitable organosilanes (a) are: $(CH_3)_2$—Si—$Cl_2$, $(CH_3)_2$—Si—$(OCH_3)_3$, $(CH_3)_2$—Si—$(OC_2H_5)_2$, $(C_6H_5)_2$—Si—$Cl_2$, $(C_6H_5)_2$—Si—$(OC_2H_5)_2$, $CH_2$=CH—Si—$Cl_3$, $CH_2$=CH—$CH_2$—Si—$(OC_2H_5)_3$, $CH_2$=CH—$CH_2$—Si—$(CH_3COO)_3$, $(i-C_3H_7)_3$—Si—OH, $(CH_3)_2$—Si—$(OH)_2$.

Illustrative of silicon-functional silanes (b) are: $SiCl_4$, $HSiCl_3$, $Si(OCH_3)_4$, $Si(OC_2H_5)_4$, $Si(CH_3COO)_4$.

Illustrative of organofunctional silanes (d) are:

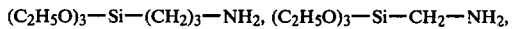
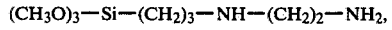
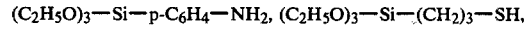
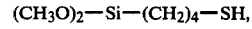
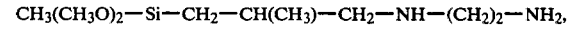
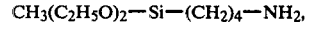
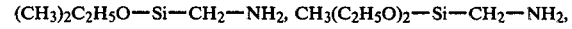
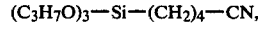
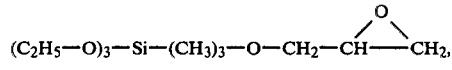
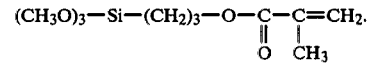

The above silanes are either commercial products or may be prepared in accordance with conventional methods; compare W. Noll, "Chemie und Technologie der Silicone", Verlag Chemie GmbH, Weinheim/Bergstrasse (1968).

Instead of the monomeric starting silanes (a) and (d), there may also be used oligomers thereof which are soluble in the reaction medium, i.e. straight-chain or cyclic, partially hydrolyzed low-molecular products (polyorganosiloxanes), their degree of condensation being about 3 to 6, preferably about 3.

Component (c) is selected from substantially involatile oxides soluble in the reaction medium, or from compounds capable of forming such substantially involatile oxides, of an element from Groups Ia to Va or IVb and Vb of the Periodic Table. Preferred is a component (c) derived from the following elements Na, K, Mg, Ca, B, Al, Pb, P, As, Ti, Zr and/or V, with Na, Ca, Mg, B, Al and P being particularly preferred.

Of the substantially involatile oxides, $Na_2O$, $K_2O$, $CaO$, $TiO_2$, $As_2O_3$ and $P_2O_5$ are preferred, particularly $B_2O_3$.

Compounds soluble in the reaction medium and capable of forming substantially involatile oxides are e.g. inorganic acids such as phosphoric acid and boric acid as well as the respective esters, halides and salts. Also suited are hydroxides such as NaOH, KOH or Ca(OH)$_2$, and alkoxides such as NaOR, KOR, Ca(OR)$_2$, Al(OR)$_3$ or Ti(OR)$_4$, wherein R is derived from lower alcohols such as methanol, ethanol, propanol and butanol. Other useful starting compounds are the respective salts of volatile acids, e.g. acetates, basic acetates, formiates, nitrates and halides, as exemplified by basic lead acetate.

For preparation of the silicic acid heteropolycondensates used in heat-sealing according to the invention, the starting components, optionally dissolved in organic solvent, are mixed in the desired ratios under exclusion of moisture. Suitable solvents are alcohols, preferably lower aliphatic alcohols such as methanol and ethanol; ketones, preferably lower dialkylketones such as acetone and methylisobutyl ketone; ethers, preferably lower dialkyl ethers such as diethyl ether; amides such as dimethylformamide; as well as mixtures thereof.

Simultaneously with or after mixing, there is added at least the stoichiometric amount of water required for hydrolyzing the hydrolyzable groups present. The term "hydrolyzable" describes groups which are hydrolyzed under the reaction conditions, i.e. SiO—alkyl, Si—H, Si-halogen, or the like. Based on the alkoxy substituent, for instance, the stoichiometric amount of water is two thirds of the quantity calculated for hydrolysis of the alkoxy radicals according to the formulae since one molecule of water is set free for every two alkoxy radicals. A high excess of water is undesirable as it leads to formation of water soluble polycondensates with a low degree of polymerization. Preferably, water is added in a quantity corresponding to at least the stoichiometric amount and not exceeding this amount by a factor of more than 20.

Optionally, polycondensation may be conducted in the presence of a catalyst, e.g., a compound acting as source of protons or hydroxyl ions, or an amine. Suitable catalysts are: water; organic and inorganic acids such as hydrochloric acid and acetic acid; organic and inorganic bases such as ammonia; alkali and alkaline earth hydroxides such as sodium and calcium hydroxide; water soluble amines such as triethylamine. Preferred are water and water soluble acids or bases, particularly water, hydrochloric acid and ammonia. The catalyst concentration may be up to about 5% by weight, based on the reaction mixture. For acids and bases, the above concentration applies to aqueous 0.1 N to 10 N solutions.

The polycondensation reaction is usually conducted at temperatures between −20° and +130° C., preferably between −20° C. and the reflux temperature of the solvent and most preferably at room temperature. Condensation time varies with the types and ratios of starting components used, the respective catalyst, reaction temperature and the like. Acid catalysts require shorter condensation periods. Generally, polycondensation is conducted at atmospheric pressure but elevated or reduced pressures may be applied as well.

On completion of the condensation reaction, the organic solvent optionally added is removed, whereupon the resulting condensate is thoroughly washed with hot water to neutral reaction and dried. If desired, thermoplasticity of the condensate may then be adjusted by a heat-treatment at 50° to 250° C. which may last from several minutes up to several hours, e.g. from 1 to 24 hours. Subsequently, the product is comminuted or pulverized by conventional means such as crushers, mortars or mills.

In addition to the silicic acid heteropolycondensate, the heat-sealing adhesives of the invention may comprise conventional additives such as fillers, dyes, pigments, adhesion promoters and other adjuvants. Moreover, other compatible thermoplasts, e.g. the conventional thermoplastic adhesives listed below, may be admixed.

Below, the invention is illustrated with respect to the heat-sealing of glass. It is to be understood, however, that the invention is not limited to this preferred embodiment, and substrates other than glass may be heat-sealed in a similar manner.

DESCRIPTION OF THE PREFERRED EMBODIMENT OF THE INVENTION

In contrast to prior art methods, heat-sealing in accordance with the invention does not involve a specific pretreatment of the glass surface. Preferably, the glass is merely degreased with e.g. organic solvents. The aging state of the glass does not noticeably affect the results of the heat-sealing process. Strong, moisture-resistant heat-sealing bonds are obtained even on glass containers that have been weathered in the open air for prolonged periods. This presents a remarkable advance over prior art sealing media which are incapable of producing satisfactory results on aged glass surfaces.

The substrate to be heat-sealed to glass may consist of glass or any desired material such as metals, paper, cardboard, plastics, or laminates. Preferred for sealing glass containers are metal foils, particularly aluminum foil. To ensure, for aesthetic reasons, that the sealing medium is detached from the glass rim and not from the metal foil when the container is opened, the metal foil may be pretreated with a primer. The substrate to be heat-sealed to the glass container may have any desired shape; suitable are sheets, foils, preformed flat or concave plates, as well as flanged caps.

For heat-sealing, the sealing medium is applied to one of the substrates; for instance, in the case of glass containers, it may be applied either to the glass rim or to the metal foil. Sealing media in pulverized form are subsequently melted onto the substrate surface, e.g. by heating to a temperature of 50° to 250° C. Also suited are extrusion coating methods wherein the sealing medium is directly applied in molten form to the surface of the substrate.

In another embodiment, the sealing medium is dissolved or dispersed in a suitable organic solvent whereupon the resulting varnish is applied to the substrate by conventional methods such a dip-coating, brushing or spraying. Illustrative of suitable organic solvents are aliphatic, cycloaliphatic, aromatic and aliphatic-aromatic hydrocarbons such as pentane, cyclohexane, benzene and toluene; preferred are polar solvents, e.g. alcohols such as methanol and ethanol, ethers such as diethylether, dioxane and tetrahydrofuran, and ketones such as acetone. The concentration of the sealing medium in the final heat-sealing varnish is generally between 0.1 and 50% by weight, a concentration of 0.1 to 10% by weight being preferred. After application, the heat-sealing varnish is dried in air at room temperature or elevated temperatures up to about 200° C.

Other conventional methods may be employed. For instance, a sealing medium in film form may be placed between the substrates and heat-sealed to them. If the heat-sealing medium of the invention is applied to the glass surface, the other substrate may be coated with an additional heat-sealing medium which may either be that of the invention or a conventional thermoplastic adhesive selected from the group of copolymers of vinylchloride, vinylidene chloride or vinyl acetate; polyacrylates and methacrylates such as polymethylmethacrylates; polyurethanes; ethylene/vinyl acetate copolymers, polyethylene, or ionomeric ethylene copolymers.

In the process of the invention, heat-sealing is conducted under usual conditions; i.e. temperatures from about 100° to 350° C. and pressures between about 2 and 5 bar for periods of about 0.1 to 10 seconds. The direct sealing method is applicable wherein heating is accomplished by a sealing tool in contact with one of the substrates, or the indirect sealing method is also applicable wherein one of the substrates is preheated to a desired temperature by means of e.g. a sealing tool, infrared radiator, gas flame, or by resistance heating. Another useful method is heating the sealing medium by induction heating.

As sealing tools, there may be employed a conventional sealing plate or sealing head. If desired, the sealing head may be designed so that it heats only the area of the final sealing bond.

Glass containers to which preformed aluminum covers or transparent caps of plastic material have been heat-sealed in accordance with the invention are well suited for storing and preserving of e.g. dry goods such as tea, coffee, instant products and medicaments; non-aqueous goods such as honey, peanut butter and cosmetics; and aqueous goods such as marmelades, jams, yoghurt and fruit juices.

The advantage of glass containers heat-sealed in accordance with the invention over prior art products resides in the fact that they have strong, durable heat-sealing bonds of excellent moisture resistance without having been subjected to time-consuming and expensive pretreating steps involving adhesion promoters. Thus, the invention offers a simple, economical method of preparing heat-sealed glass containers while avoiding any risk of contaminating the goods contained in them with adhesion promoters.

The following examples serve to illustrate the invention.

EXAMPLE 1

In an open vessel, a solution of 15 ml methanol, 3.5 ml tetramethoxy silane and 10 ml dichlorodiphenyl silane, together with 200 ml water, is heated to 50° C. and maintained at this temperature for 15 minutes without agitation. The condensate settling on the bottom of the vessel is removed from the supernatant solution by decantation, washed with water to neutral reaction and dried at 150° C. for 3 hours.

After cooling, 1 g of the dried condensate is dissolved in 2 g dioxane. The varnish thus obtained is applied (about 4–6 g/sq.m.) to the dull surface of an aluminum foil having a thickness of 0.040 mm. The solvent is removed by drying the coated foil for about 10 seconds at 200° C. in a drying oven.

To hermetically seal a glass container filled with water (width of sealing rim 3 mm), an appropriate blank is punched from the coated foil and heat-sealed to the container for 3 seconds at 200° C. using a heated sealing head. Even after the container has been stored for 4 months, the heat-sealing bond remains impervious to water.

EXAMPLE 2

The process of Example 1 is repeated with a condensate prepared from 3.5 ml tetraethoxy silane, 10 ml dichlorodiphenyl silane and 15 ml ethanol. The results obtained are comparable to those of Example 1.

EXAMPLE 3

The process of Example 1 is repeated with a condensate prepared from 3 ml tetramethoxy silane, 1 ml γ-aminopropyl triethoxy silane, 5 ml methylvinyldichloro silane, 5 ml dichlorodiphenyl silane and 15 ml methanol. The results obtained are as good as in the preceding examples.

EXAMPLE 4

After drying, the condensates prepared according to Examples 1 to 3 are applied to a glass surface as a 50 wt.% solution in acetone. The coated glass surface is dried for 5 minutes at room temperature and subsequently heat-sealed for 1 second at 220° C. to an uncoated aluminum strip having a length of 50 mm, a width of 10 mm and a thickness of 0.06 mm. The average strength of the sealing bond when peeled off at an angle is measured in a tensile tester and amounts to about 0.3 N/cm for freshly sealed foils. The strength does not decrease when the samples are stored in water for 4 weeks.

EXAMPLE 5

As described in Example 1, a condensate is prepared from 3.5 ml tetramethoxy silane, 0.5 ml tetraethyl orthotitanate, 10 ml dichlorodiphenyl silane and 15 ml methanol. The dried condensate is applied as a 10 wt.% solution in acetone to small, heat-treated glass plates having a size of 20 to 50 mm, and the coating is dried at room temperature for some minutes. Subsequently, strips of aluminium foil of 1 cm width coated with low density polyethylene are sealed to the glass surface by heating to 200° C. for 3 seconds.

To determine the water resistance of the heat-sealing bond, the samples are stored in distilled water at room temperature. After 4 weeks, no decrease in sealing strength is detectable.

EXAMPLE 6

The process of Example 5 is repeated, using leached instead of heat-treated glass plates. Here too, 4 weeks of aging in water do not result in a measurable decrease in sealing strength.

EXAMPLE 7

The process of Example 5 is repeated with a condensate prepared from 5 ml tetraethyl orthotitanate, 10 ml dichlorodiphenyl silane and 15 ml methanol. The samples are stored in a 5 wt.% solution of acetic acid without any decrease in sealing strength being observed.

We claim:

1. A method for heat-sealing a first glass substrate to a second substrate, comprising the steps of:
    applying to said glass substrate or to said second substrate, without previously coating said glass substrate with an adhesion promoter, a heat sealing adhesive consisting essentially of a thermoplastic heteropolycondensate prepared by hydrolysis of and polycondensation of:
    (a) 20 to 95% by weight of at least one organosilane of the general formula (I):

$$R_m SiX_{4-m} \qquad (I),$$

wherein R is alkyl, alkenyl, aryl, alkylaryl, or arylalkyl; X is hydrogen, halogen, hydroxyl, alkoxy, acyloxy, or a group —NR′$_2$ wherein R′ is hydrogen and/or alkyl; and m is an integer of 1, 2 or 3; with at least one of the following components (b), (c) and (d), the total concentration of components (b), (c) and (d) being at least 5% by weight:

(b) 0 to 40% by weight of one or more silicon-functional silanes of the general formula (II):

$$SiX_4 \qquad (II)$$

wherein X is as defined above, with the proviso that not all of substituents X are hydrogen;

(c) 0 to 40% by weight of one or more substantially involatile oxides soluble in the reaction medium, or one or more compounds capable of forming such substantially involatile oxides, of an element selected from Groups Ia to Va or IVb and Vb of the Periodic Table; and (d) 0 to 20% by weight of one or more organofunctional silanes of the general formula (III):

$$R_n(R''Y)_p SiX_{(4-n-p)} \qquad (III),$$

wherein R and X are as defined above; R" is straight chain or branched alkylene optionally interrupted by oxygen or sulfur atoms or —NH—groups, phenylene, alkylphenylene, or alkylenephenylene; Y is halogen, unsubstituted or substituted amino, unsubstituted or substituted anilino, aldehyde, keto, carboxyl, hydroxyl, mercapto, cyano, hydroxyphenyl, carboxylic acid alkyl ester, sulfonic acid, phosphoric acid, acryloxy, methacryloxy, glycidyloxy, epoxy, or vinyl; n is an integer of 0, 1 or 2; and p is an integer of 1, 2 or 3, the sum of n+p being an integer of 1, 2 or 3;

in the presence of at least the stoichiometric amount of water required for hydrolysis, and optionally in the presence of a condensation catalyst and/or solvent, wherein in the case of starting components (a) and (d), oligomers of these silanes which are soluble in the reaction medium may also be used; and heat sealing said glass substrate to said second substrate.

2. The method according to claim 1 wherein, based on oxide units, the silicic acid heteropolycondensate comprises from 30 to 90% by weight of component (a), from 0 to 60% by weight of component (b), from 0 to 40% by weight of component (c), and from 0 to 20% by weight of component (d).

3. The method according to claim 2 wherein, based on oxide units, the silicic acid heteropolycondensate comprises from 30 to 90% by weight of component (a), from 0 to 40% by weight of component (b), from 0 to 30% by weight of component (c), and from 0 to 10% by weight of component (d), the total concentration of components (b), (c) and/or (d) being at least 10% by weight.

4. The method according to claim 1 wherein, in addition to the silicic acid heteropolycondensate, the heat-sealing heteropolycondensate includes a thermoplastic adhesive compatible therewith.

5. The method according to claim 1, wherein the sealing medium is applied to said glass substrate and the thus coated glass is heat-sealed to said second substrate.

6. The method according to claim 2, wherein the sealing medium is applied to said glass substrate and the thus coated glass is heat-sealed to said second substrate.

7. The method according to claim 3, wherein the sealing medium is applied to said glass substrate and the thus coated glass is heat-sealed to said second substrate.

8. The method according to claim 1, wherein said second substrate is coated with an additional sealing medium before said heat-sealing step.

9. The method according to claim 2, wherein said second substrate is coated with an additional sealing medium before said heat-sealing step.

10. The method according to claim 3, wherein said second substrate is coated with an additional sealing medium before said heat-sealing step.

11. The method according to claim 1, wherein the sealing medium is applied to said second substrate and the substrate thus coated is heat-sealed to glass.

12. The method according to claim 2, wherein the sealing medium is applied to said second substrate and the substrate thus coated is heat-sealed to glass.

13. The method according to claim 3, wherein the sealing medium is applied to said second substrate and the substrate thus coated is heat-sealed to glass.

14. The method according to claim 1, wherein the heat-sealing heteropolycondensate is placed between the substrates in the form of a film and subsequently heat-sealed thereto.

15. The method according to claim 2, wherein the heat-sealing heteropolycondensate is placed between the substrates in the form of a film and subsequently heat-sealed thereto.

16. The method according to claim 3, wherein the heat-sealing heteropolycondensate is placed between the substrates in the form of a film and subsequently heat-sealed thereto.

17. The method according to claim 1, wherein said second substrate is a metal foil.

18. The method according to claim 2, wherein said second substrate is a metal foil.

19. The method according to claim 3, wherein said second substrate is a metal foil.

20. The method according to claim 17, wherein said metal foil is aluminum foil.

21. The method according to claim 18, wherein said metal foil is aluminum foil.

22. The method according to claim 19, wherein said metal foil is aluminum foil.

23. The method according to claim 17, wherein said metal foil is pretreated with a primer prior to heat-sealing.

24. The method according to claim 18, wherein said metal foil is pretreated with a primer prior to heat-sealing.

25. The method according to claim 19, wherein said metal foil is pretreated with a primer prior to heat-sealing.

26. A method according to claim 1, wherein said heat-sealing heteropolycondensate is dissolved or dispersed in an organic solvent to form a varnish prior to being applied to said glass substrate or to said second substrate.

27. A method according to claim 26, wherein the concentration of said heteropolycondensate in said varnish is between 0.1 to 50% by weight.

28. A method according to claim 27, wherein the concentration of said heteropolycondensate in said varnish is between 0.1 and 10% by weight.

29. A method according to claim 1, wherein said glass substrate is a glass container and said second substrate is heat-sealed to said glass container to hermetically seal said glass container.

30. A method according to claim 2, wherein said glass substrate is a glass container and said second substrate is heat-sealed to said glass container to hermetically seal said glass container.

31. A method according to claim 3, wherein said glass substrate is a glass container and said second substrate is heat-sealed to said glass container to hermetically seal said glass container.

32. A method according to claim 29, wherein said second substrate is a metal foil.

33. A method according to claim 30, wherein said second substrate is a metal foil.

34. A method according to claim 31, wherein said second substrate is a metal foil.

35. A method according to claim 32, wherein said metal foil is aluminum foil.

36. A method according to claim 33, wherein said metal foil is aluminum foil.

37. A method according to claim 34, wherein said metal foil is aluminum foil.

38. A glass container produced by the method of claim 1, 2, 3, 4, 17, 18, 19, 20, 21, 22, 29, 30, 31, 32, 33, 34, 35, 36 or 37.

39. A glass container containing aqueous goods produced by the method of claim 29, 30, 31, 32, 33, 34, 35, 36 or 37.

* * * * *